Patented Jan. 16, 1940

2,187,668

UNITED STATES PATENT OFFICE 2,187,668

WATERPROOF QUICK-SETTING ADHESIVE PORTLAND CEMENT AND PROCESS OF MAKING SAME

Lloyd L. Smith, Minneapolis, Minn.

No Drawing. Application May 23, 1938,
Serial No. 209,603

1 Claim. (Cl. 106—97)

This invention relates to a waterproof quick-setting adhesive Portland cement and process of making same.

Ordinarily the surface must be first wet down before conventional cement paints can be applied, and such paints and mortars require after-wetting in order that the cement may properly cure.

It is an object of the present invention therefore to provide a cement paint, or mortar, which is adapted to be applied to a dry surface and to a surface which is perfectly smooth in contrast to the usual roughening of the surface to which conventional cement paints or mortars are to be applied.

If conventional cements are not properly wetted and given after-attention by keeping it wet down, and protected from the weather, the cement dries off and disintegrates into powder.

With this in mind it is another object of the invention to provide a cement which is self-curing and when applied a film quickly forms over the surface of the cement to protect it from the weather while curing.

A further object is to provide a waterproof quick-setting adhesive Portland cement which will be cheap to manufacture and easy to pack and ship.

The invention consists broadly of a mixture of quick lime, stearin, casein and Portland cement.

In order to obtain proper chemical reactions in the above ingredients I employ the following method in general. The stearin is mixed with water and heated until it melts. Powdered quick lime is placed in a drum, tank or metal barrel which container is provided with a tight cover provided with a suitable pressure valve to retard the escape of steam and to develop ample pressure within the container. The melted stearin and water mixture is then poured into the drum onto the lime, the cover is clamped on, and the container is slowly revolved to obtain a thorough and intimate mixture and to prevent local overheating. The slacking of the lime by the melted stearin and water mixture produces steam and heat, the escape of steam from the drum being sufficiently retarded to assure hydration of the lime and to facilitate formation of calcium compounds with the stearin. The escape of steam is so regulated that when all is driven off, the lime compounds are in the form of fine apparently dry powder. The resultant powder is then mixed with dry powdered casein and Portland cement.

The process of manufacture and the resultant composition of matter permits variation in quantities of ingredients within reasonable limits for certain grades of products and increase of adhesive, waterproofing and other properties. As an example, the following quantities may be used.

Five pounds of stearin are melted with three gallons of water. An amount of water in excess of that necessary for formation of calcium hydroxide is provided to compensate for escape of steam during hydration of the lime, thereby making certain that the lime will be fully slacked. This melted stearin water mixture, is then poured into about thirty-three pounds of quick lime in an appropriate container and the mixture is allowed to hydrate and slack the lime. Thirty-five pounds of the dry lime stearin powder so prepared are then mixed with seventy pounds of casein of sufficient fineness to pass through a fine wire mesh. The resultant dry lime stearin casein reaction product is mixed with Portland cement in the proportion of one pound of the mixture to seventeen pounds of the cement. The product so obtained will contain approximately a proportion of materials consisting of five parts stearin, thirty-three parts quick lime, seventy-two parts casein, 1750 parts Portland cement. Because of the casein in the mixture an adhesive agent is contained in the product. By adding water to the dry mixture and allowing it to stand about fifteen minutes to permit the casein to dissolve the cement paint becomes tacky and adhesive and can be applied to any dry surface without roughening the surface for bond, and to concrete, brick, stone, metal, glass, wood and other solid materials.

Due to the presence of stearin which produces waterproofing qualities and also due to the presence of casein which produces adhesive qualities, the paint will set quickly and develop a hard surface film which protects the paint from weather conditions while it is curing. Also this film holds the moisture in the paint permitting it to hydrate the cement so that the cement is self-curing. Although coatings of the cement become very hard within two or three hours the cement continues to hydrate and self-cure requiring about 28 days for an ultimate cure. If, during this period or for much longer periods, the surface becomes wet by rain, mists, or other means, the moisture penetrates the surface or has a hydrating or curing action on the cement thus causing the finish to become harder or stronger with age.

What is claimed is:

A hydrophilic composition of matter, reactable with water to produce a hard hydrophobic composition, comprising an essentially apparently dry homogeneous pulverulent mixture of: (1) approximately thirty-five parts by weight of the reaction products of about five parts by weight of stearin, about thirty-three parts by weight CaO and about twenty-five parts by weight of water; (2) approximately seventy parts by weight of casein; and (3) approximately seventeen hundred eighty-five parts by weight of Portland cement.

LLOYD L. SMITH.